US009613626B2

(12) United States Patent
Chen et al.

(10) Patent No.: US 9,613,626 B2
(45) Date of Patent: Apr. 4, 2017

(54) AUDIO DEVICE FOR RECOGNIZING KEY PHRASES AND METHOD THEREOF

(71) Applicant: Fortemedia, Inc., Santa Clara, CA (US)

(72) Inventors: Lung-Chu Joseph Chen, Pleasanton, CA (US); Qing Guang Liu, Sunnyvale, CA (US); Wilson Or, Belmont, CA (US); Yen-Son Paul Huang, Los Altos Hills, CA (US); Xiao Lin, Fremont, CA (US)

(73) Assignee: FORTEMEDIA, INC., Santa Clara, CA (US)

( * ) Notice: Subject to any disclaimer, the term of this patent is extended or adjusted under 35 U.S.C. 154(b) by 0 days.

(21) Appl. No.: 14/953,684

(22) Filed: Nov. 30, 2015

(65) Prior Publication Data

US 2016/0232899 A1 Aug. 11, 2016

Related U.S. Application Data

(60) Provisional application No. 62/112,841, filed on Feb. 6, 2015.

(51) Int. Cl.
*G10L 17/00* (2013.01)
*G10L 15/22* (2006.01)
*G10L 15/02* (2006.01)
*G10L 15/08* (2006.01)
*G10L 25/78* (2013.01)

(52) U.S. Cl.
CPC ............ *G10L 15/22* (2013.01); *G10L 25/78* (2013.01); *G10L 2015/027* (2013.01); *G10L 2015/088* (2013.01); *G10L 2015/223* (2013.01)

(58) Field of Classification Search
CPC ......... G10L 15/22; G10L 15/08; G10L 15/26; G10L 2015/088; G06F 17/30681; G06F 3/167
USPC ........................................ 704/270, 275, 248
See application file for complete search history.

(56) References Cited

U.S. PATENT DOCUMENTS

| | | | |
|---|---|---|---|
| 6,408,270 B1* | 6/2002 | Garber | G06F 17/30675 704/251 |
| 7,050,973 B2* | 5/2006 | Aronowitz | G10L 17/08 704/246 |
| 7,353,172 B2* | 4/2008 | Emonts | G10L 15/187 704/244 |
| 7,418,392 B1* | 8/2008 | Mozer | G10L 15/26 315/307 |

(Continued)

*Primary Examiner* — Jakieda Jackson
(74) *Attorney, Agent, or Firm* — McClure, Qualey & Rodack, LLP

(57) ABSTRACT

An audio device and a method thereof are provided. The method is adopted by an audio device to detect a voice, wherein the audio device is coupled to a host device. The method includes an acoustic conversion circuit converting an acoustic wave into an analog audio signal; an analog-to-digital converter (ADC) converting the analog audio signal into digital audio data; a first-level voice detection circuit detecting voice activity in the analog audio signal; a second-level voice detection circuit detecting a beginning syllable of a key phrase in the digital audio data when the voice activity is detected in the digital audio data; and a third-level voice detection circuit detecting the key phrase from the digital audio data only when the beginning syllable of the key phrase is detected in the digital audio data.

18 Claims, 4 Drawing Sheets

(56) References Cited

U.S. PATENT DOCUMENTS

| | | | | |
|---|---|---|---|---|
| 2004/0167674 A1* | 8/2004 | Voeller | .................. | G01B 21/26 |
| | | | | 700/279 |
| 2004/0230637 A1* | 11/2004 | Lecoueche | .............. | G10L 15/20 |
| | | | | 709/200 |
| 2006/0241916 A1* | 10/2006 | Sieracki | .................. | G10L 25/00 |
| | | | | 702/19 |
| 2008/0267416 A1* | 10/2008 | Goldstein | ............ | H04R 1/1091 |
| | | | | 381/56 |
| 2012/0116774 A1* | 5/2012 | Forsell | ............... | A61N 1/37217 |
| | | | | 704/270 |
| 2013/0339028 A1* | 12/2013 | Rosner | ................. | G10L 15/222 |
| | | | | 704/275 |
| 2014/0244273 A1* | 8/2014 | Laroche | ................ | G06F 1/3206 |
| | | | | 704/275 |
| 2015/0161989 A1* | 6/2015 | Hsu | ........................ | G10L 15/08 |
| | | | | 704/251 |

\* cited by examiner

AUDIO DEVICE FOR RECOGNIZING KEY PHRASES AND METHOD THEREOF

CROSS REFERENCE TO RELATED APPLICATIONS

This application claims priority of U.S. Provisional Application No. 62/112,841, filed on Feb. 6, 2015, the entirety of which is incorporated by reference herein.

BACKGROUND OF THE INVENTION

Field of the Invention

The present invention relates to voice recognition, and in particular, to an audio device that recognizes key phrases, and a method thereof.

Description of the Related Art

As technology advances, the demand for mobile computing devices such as cellular phones, tablets, wearables, and laptops to stay "always-on" and "continuously-connected" to the Internet and cloud-based networks is ever-increasing. In the voice applications of such mobile computing devices, the "always-on" capability provides prompt reaction to voice inputs, and the "continuously-connected" feature allows cloud-based information to be readily processed and accessible to the user at any time. In such cases, extending the battery life, as well as providing seamless voice data capture and processing between an acoustic frontend and a cloud-based backend, are of critical concern.

Therefore, an audio device that can recognize key phrases and a method thereof are needed to provide a seamless voice interface service and reduce power consumption.

BRIEF SUMMARY OF THE INVENTION

A detailed description is given in the following embodiments with reference to the accompanying drawings.

An embodiment of an audio device coupled to a host device is provided, comprising an acoustic conversion circuit, an analog-to-digital converter (ADC), and a controller comprising a first-level voice detection circuit, a second-level voice detection circuit and a third-level voice detection circuit. The acoustic conversion circuit is configured to convert an acoustic wave into an analog audio signal. The ADC, coupled to the acoustic conversion circuit, is configured to convert the analog audio signal into digital audio data. The first-level voice detection circuit, coupled to the acoustic conversion circuit, is configured to detect voice activity in the analog audio signal. The second-level voice detection circuit, coupled to the first-level voice detection circuit, is configured to detect a beginning syllable of a key phrase in the digital audio data when the voice activity is detected. The third-level voice detection circuit, coupled to the second-level voice detection circuit, is configured to detect the key phrase from the digital audio data only when the beginning syllable of the key phrase is detected in the digital audio data.

Another embodiment of a method is disclosed, adopted by an audio device to detect a voice, wherein the audio device is coupled to a host device, the method comprising: converting, by an acoustic conversion circuit, an acoustic wave into an analog audio signal; converting, by an analog-to-digital converter (ADC), the analog audio signal into digital audio data; detecting, by a first-level voice detection circuit, a voice activity in the analog audio signal; detecting, by a second-level voice detection circuit, a beginning syllable of a key phrase in the digital audio data when the voice activity is detected in the digital audio data; and detecting, by a third-level voice detection circuit, the key phrase from the digital audio data only when the beginning syllable of the key phrase is detected in the digital audio data.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Various embodiments of the present application are in connection with a voice interface device (VID), which is an intelligent microphone integrating one or more acoustic transducers with one or more signal processing circuits such as a Reduced Instruction Set Computer (RISC) or Digital Signal Processor (DSP). A VID may be connected to a host device to form a voice interface system, which may be a smartphone, a media player, a voice recorder, a video recorder, a gaming console, a Personal Digital Assistant (PDA), a wearable device, a tablet computer, a laptop computer, a medical device, or a computing system including a voice or speech platform that may initiate an automated service. The "host device" in the present application may be a computing device which may provide a service according to a voice or speech or redirect the voice or speech to a cloud server via the Internet, and may be a signal processing chip.

The term "sleep mode" in the present application may also be referred to as a low power mode, a power-saving mode, a hibernation mode, a standby mode, a suspend mode, or an idle mode.

Expressions such as "connected" or "coupled" refer not only to one component being directly connected or coupled to another component, but also there may exist another component between them. Meanwhile, in cases where a component is referred to as being "directly connected" to other component, it should be understood that there is no component therebetween.

Also, singular forms in the present application are intended to include plural forms unless the context clearly indicates otherwise.

Figure 1:
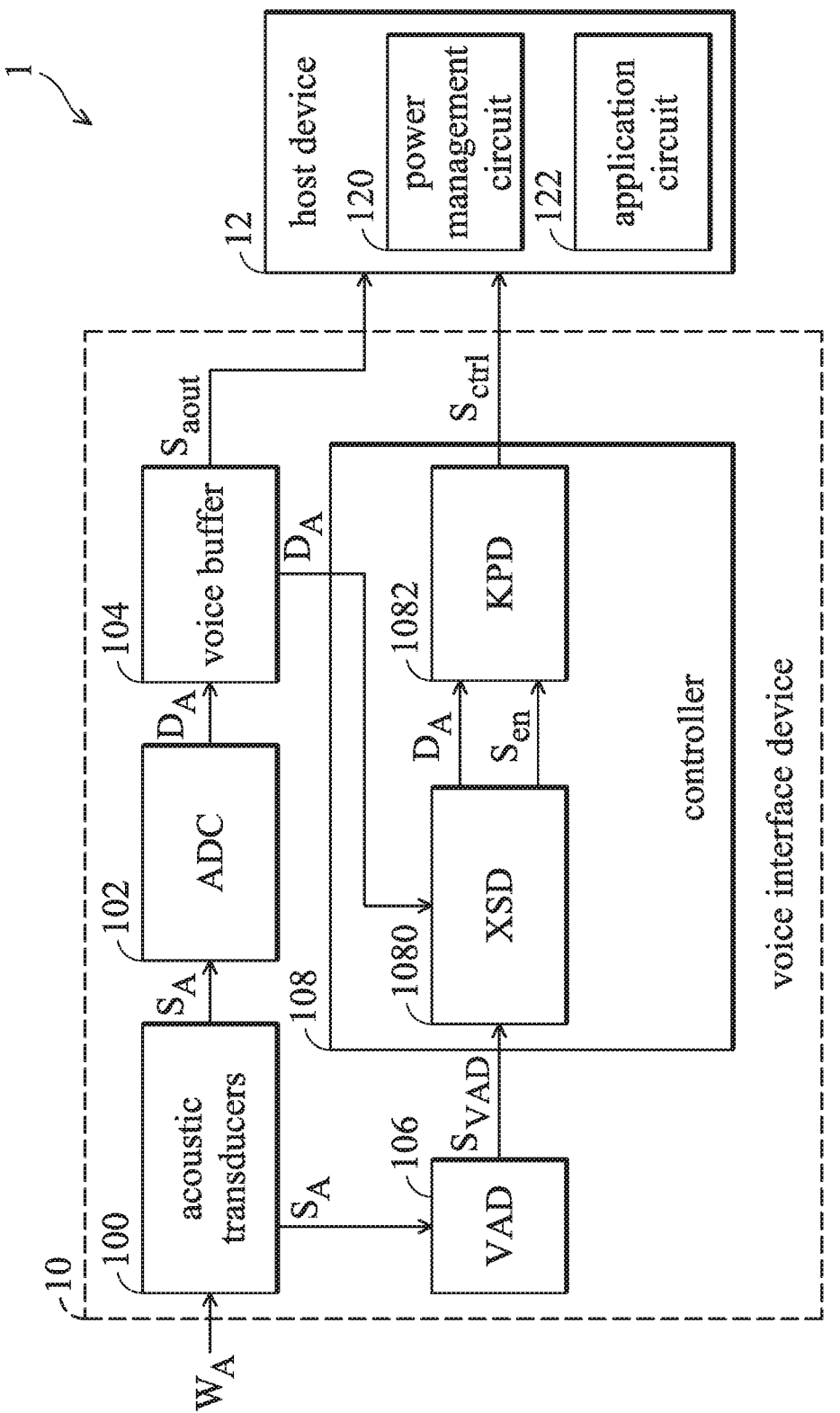
FIG. 1 is a block diagram of a voice interface system 1 according to an embodiment of the invention.

FIG. 1 is a block diagram of a voice interface system 1 according to an embodiment of the invention, including a voice interface device 10 (audio device) and a host device 12. The voice interface system 1 may process an audio data stream which includes a Key Phrase serving as a wake-up trigger and a voice command for initiating a service or an application. The voice interface system 1 may reduce total power consumption while remaining "always-on", improving the voice command recognition rate, as well as providing the speaker's ambient acoustics information to perform the services or applications.

The voice interface system 1 may operate in the low-power sleep mode until the user issues a specific voice request to trigger a system wake-up. The specific voice request for triggering the system wake-up may be referred to as a "key phrase", which may be either user-defined or application-specific, and may be a simple single utterance of a keyword, or a plurality of words forming a short phrase.

The voice interface device 10 and the host device 12 may be connected through a wired connection. For example, the voice interface device 10 may connect directly to the host device 12 via a data line and a control line.

The host device 12 may operate in a normal operation mode or a sleep mode. In the normal operation mode, the host device 12 may provide a service or an application according to a key phrase, such as a voice call, a video call, a message service, or a data service. In the sleep mode, the host device 12 may considerably reduce power consumption compared to operating in the normal operation mode.

When the host device 12 enters the sleep mode, the voice interface device 10 may remain on and continuously monitor for voice input to identify a specific user request. Upon identifying the specific user request, the voice interface device 10 may transmit a control signal $S_{ctrl}$ to wake up the host device 12 from the sleep mode. The voice interface device 10 not only replaces conventional microphones for sound capture, but also serves to increase or maximize power efficiency and voice processing efficiency of the voice interface system 1 in "always-on" and "continuously-connected" applications.

The voice interface device 10 contains acoustic transducers 100 (acoustic conversion circuit), an analog-to-digital converter (ADC) 102, a voice buffer 104, a voice activity detector (VAD) 106 (first-level voice detection circuit), and a controller 108 which includes an extendable speech detection (XSD) circuit 1080 (second-level voice detection circuit) and a key phrase detection (KPD) circuit 1082 (third-level voice detection circuit).

The acoustic transducers 100, including one or more acoustic transducers, may monitor ambient sounds to convert an acoustic wave $W_A$ into an analog audio signal $S_A$, which are supplied to the ADC 102 to be converted into digital audio data $D_A$ and to the VAD circuit 106 to detect voice activity. Each acoustic transducer has properties such as transducer sensitivity, a transducer noise floor and a transducer frequency response. The acoustic transducers 100 may be arranged into an array configured according to transducer phases, transducer gains, a transducer placement geometry, and inter-transducer distances, outputting a plurality of channels of the analog audio signals $S_A$ to the ADC 102 for conversion into a plurality of channels of digital audio data $D_A$.

The ADC 102 may be a delta signal ADC or other types of ADCs which may digitize the acoustic wave $W_A$ to output the digital data stream $D_A$ for further signal processing. The digital audio data $D_A$ may be buffered in the voice buffer 104 for later use. Each channel of digital data stream $D_A$ are retained in the voice buffer 104 in a first-in-first-out (FIFO) manner. The voice buffer 104 acts as managed data storage to preserve the voice command in the digital audio data $D_A$. This data storage and transport management in the voice interface device 10 are used to facilitate a seamless voice interface operation.

The VAD 106 may perform a first level detection to determine whether any voice activity or merely ambient noise exists in the analog audio signal $S_A$. When VAD 106 decides that the likelihood of voice activity is high in the analog audio signal $S_A$, it may activate subsequent speech recognition operations by sending a voice activity signal $S_{VAD}$ to the controller 108. The VAD circuit 106 is implemented in low power analog circuitry to allow the controller 108 of the voice interface device 10 to stay in a power-efficient sleep state until activation becomes necessary.

After receiving the voice activity signal $S_{VAD}$, the XSD circuit 1080 in the controller 108 may be activated to perform a second level detection, which involves detection of the beginning syllable of the key phrase in the digital audio data $D_A$. The XSD circuit 1080 may receive the digital audio data $D_A$ from the voice buffer 104 and detect either a single syllable or a group of continuous syllables of the key phrase in the digital audio data $D_A$. The key phrase may be configured and stored in a local memory device (not shown). When no match for the single syllable or the group of continuous syllables of the key phrase is found in the digital audio data $D_A$, the XSD circuit 1080 may terminate the subsequent speech recognition operations and wait for the next voice activity detection. When a match for the single syllable or the group of continuous syllables of the key phrase is found in the digital audio data $D_A$, the XSD circuit 1080 may in turn activate the KPD circuit 1082 to perform a third level detection by an enable signal $S_{en}$.

After receiving the enable signal $S_{en}$, the KPD circuit 1082 may run a Key Phrase Detection on the digital audio data $D_A$ from the voice buffer 104, to decide whether the user-designated or application-designated key phrase is present in the digital audio data $D_A$. When no match for the key phrase is found in the digital audio data $D_A$, the KPD circuit 1082 may terminate subsequent operations and wait for the next voice activity detection. When a match for the key phrase is found in the digital audio data $D_A$, the KPD circuit 1082 may issue the control signal $S_{ctrl}$ to trigger a wake-up in the host device 12. Upon receiving a trigger, the host device 12 will be woken up from the sleep mode and retrieve the digital audio data $D_A$ stored in the voice buffer 104 of the voice interface device 10 to either perform subsequent processes or redirect the digital audio data $D_A$ to a cloud server via the Internet.

The XSD circuit 1080 operates at lower power since the detection of the syllable or the group of syllables of the key phrase involves a much simpler algorithm and requires fewer computation cycles than matching the entire Key Phrase to the digital audio data $D_A$, resulting in a further power reduction in the voice interface device 10.

Once the voice interface device 10 issues the wake-up trigger via the control signal $S_{ctrl}$ to the host device 12, it may take a certain amount of time for the host device 12 to initialize and resume normal operations. Meanwhile, the user may have already given a voice command immediately after the key phrase. In order to provide seamless operation between the voice interface device 10 and a voice service engine in the internet cloud, no part of the voice command must be lost.

The host device 12 includes a power management circuit 120 and an application circuit 122. The power management circuit 120 may control the circuits in the host device 12 to operate under the normal operation mode or the sleep mode. When the host device 12 is in the sleep mode, the power management circuit 120 may receive the wake-up trigger in the control signal $S_{ctrl}$ from the voice interface device 10 to switch to the normal operation mode. After receiving the wake-up trigger, the power management circuit 120 may activate the application circuit 122 for providing the service or the application. The power management circuit 120 may return a ready message in the control signal $S_{ctrl}$ to the voice interface device 10 upon completion of the initialization of the host device 12. In response to the ready message, the voice interface device 10 may package and modulate the digital audio data $D_A$ into an audio signal $S_{aout}$ according to a predefined protocol, and transmit the audio signal $S_{aout}$ to the host device 12. In turn, the application circuit 122 may perform the application according to the digital audio data $D_A$ in audio signal $S_{aout}$.

The voice interface system 1 allows the host device 12 to enter the sleep mode for reducing power consumption, while utilizing the voice interface device 10 to wake up the host device 12 to provide seamless voice interface services whenever required.

Figure 2:
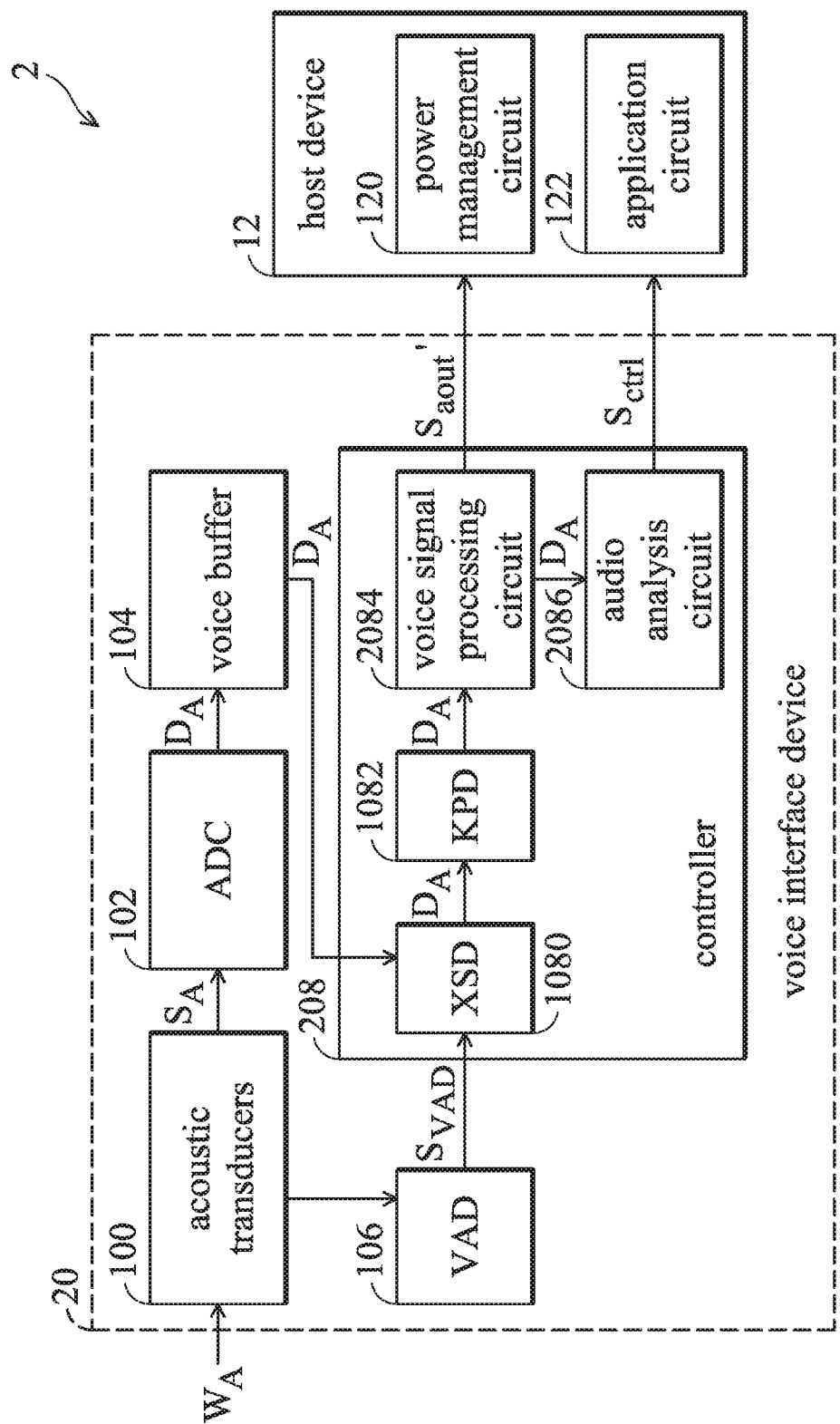
FIG. 2 is a block diagram of a voice interface system 2 according to another embodiment of the invention.

FIG. 2 is a block diagram of a voice interface system 2 according to another embodiment of the invention. The voice interface system 2 is different from the voice interface system 1 in that a voice signal processing circuit 2084 and an audio analysis circuit 2086 are further incorporated into a controller 208.

Accordingly, a match for the key phrase may be found in the digital audio data $D_A$ by the KPD circuit 1082. Once the match for the key phrase is found, the voice signal processing circuit 2084 may be activated to receive all the digital audio data $D_A$ in the voice buffer 104, and perform voice signal enhancement operations on the digital audio data $D_A$ to generate the enhanced audio data $D_A'$ and then transmit the enhanced digital audio data $D_A'$ to the host device 12. The voice signal enhancement operations may include, but are not limited to, acoustic echo cancellation, noise suppression, and microphone array signal processing.

In some embodiments, when the key phrase is detected in the digital audio data $D_A$, the voice signal processing circuit 2084 may compress the digital audio data $D_A$ or the enhanced audio data $D_A'$, and then transmit the compressed digital audio data $D_{A\_COMP}$ to the host device 12.

The controller 208 has sufficient computational power to ensure that, before a transmission to the host device 12, all voice signal enhancements and compression to the digital audio data $D_A$ are completed, thereby increasing the transmission speed and voice recognition rate in the host device 12 or in the cloud network. The enhanced audio data $D_A'$ or the compressed digital audio data $D_{A\_COMP}$ are packaged and modulated in the audio signal $S_{aout}'$ to be passed on to the host device 12 via a high throughout data link, thereby ensuring its availability to the host device 12 or the voice service engine in the cloud network. This further facilitates the seamless voice command and voice interface service between the voice interface device 20 and host device 12 or the cloud network backend.

In addition, the audio analysis circuit 2086 of the controller 208 may run a plurality of audio scene analysis and classification algorithms to determine the ambient acoustics information of the digital audio data $D_A$ and send the ambient acoustics information by an analysis signal $S_{an}$ to the host device 12. The ambient acoustics information includes a classification and a feature extracted from the digital audio data $D_A$. Specifically, the audio analysis circuit 2086 may extract a feature from the digital audio data $D_A$. Specifically, the audio analysis circuit 2086 may conduct analysis on the digital audio data $D_A$ and then classify the digital audio data $D_A$ into one of the several defined noise types.

The audio analysis circuit 2086 may also determine configuration information at run-time. The configuration information may include, but is not limited to, speaker direction information and other important configuration information, which may include, but is not limited to, the transducer phase, the transducer sensitivity, the transducer noise floor, the transducer placement geometry, the inter-transducer distances, and the transducer frequency response of the acoustic transducers 100. The audio analysis circuit 2086 may then package the configuration information and deliver them in the analysis signal $S_{an}$ to the host device 12, where the configuration information may be used locally or redirected to a collaborating component such as the voice command engine in the cloud-based network for further upstream signal processing or data fusion. The configuration information about the acoustic transducers 100 may be used to improve performances for data fusion application on the voice command engine in the cloud-based network.

The audio signal Saout' containing the enhanced audio data DA' and the analysis signal San containing the acoustic ambient information and configuration information may respectively be transmitted from the voice signal processing circuit 2084 and the audio analysis circuit 2086 to the host device 12.

Figure 3:
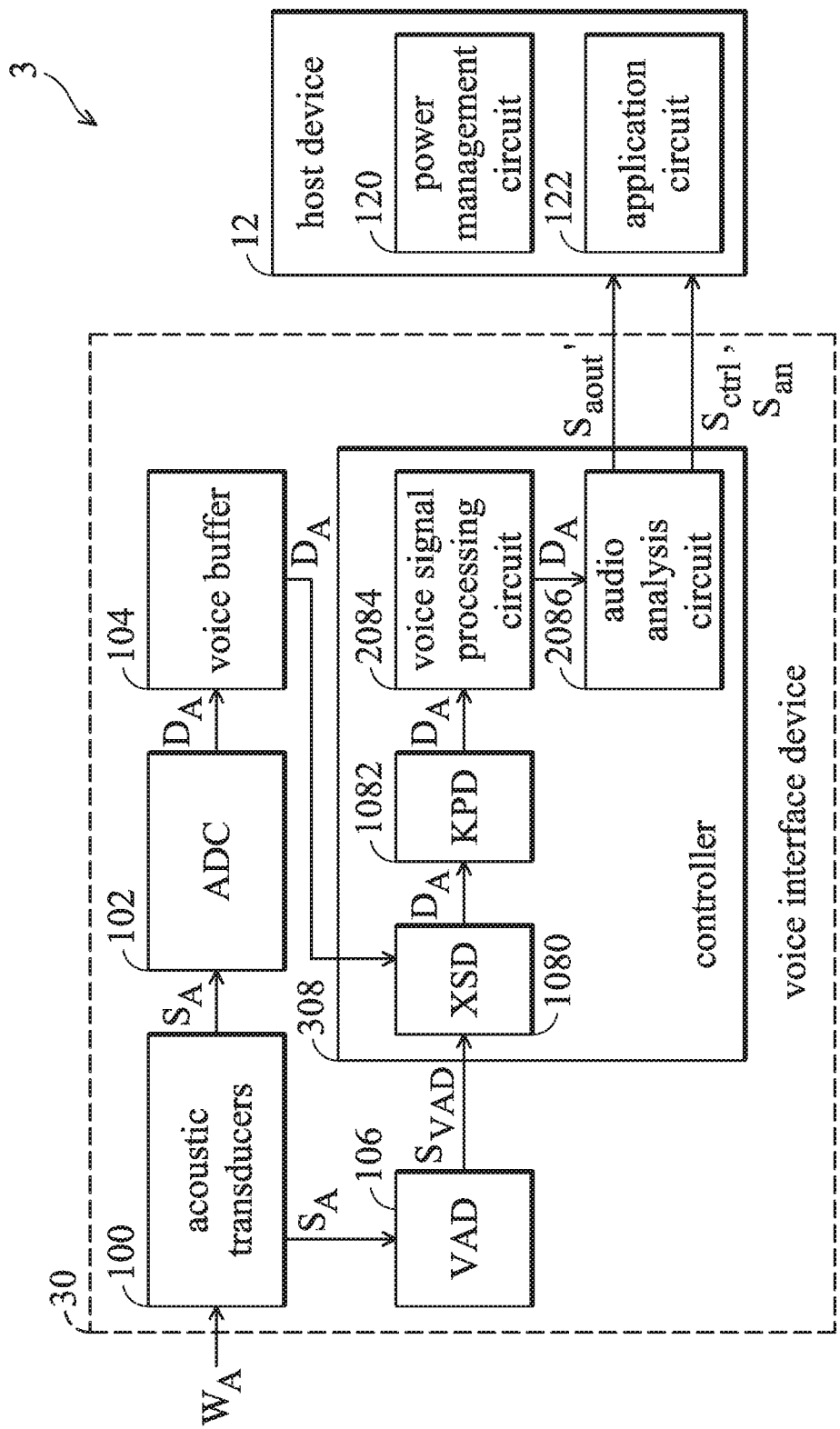
FIG. 3 a block diagram of a voice interface system 3 according to another embodiment of the invention.

FIG. 3 is a block diagram of a voice interface system 3 according to another embodiment of the invention. The voice interface system 3 is similar to voice interface system 2 and is only different from the voice interface system 2 in that both the audio signal Saout' containing the enhanced audio data DA' and the analysis signal San containing the acoustic ambient information and configuration information may be transmitted from the audio analysis circuit 2086 to the host device 12.

The voice interface systems 2 and 3 allow the host device 12 to enter the sleep mode for reducing power consumption, while utilizing the voice interface device 10 to wake up the host device 12, extract the useful acoustic ambient information and configuration information, and enhance the digital audio data $D_A$ to provide seamless and enhanced voice interface services whenever required.

All circuits in the controllers 108, 208, and 308 in FIGS. 1 through 3 may be implemented by hardware circuits, or software codes loadable and executable by a processor or a microprocessor.

Figure 4:
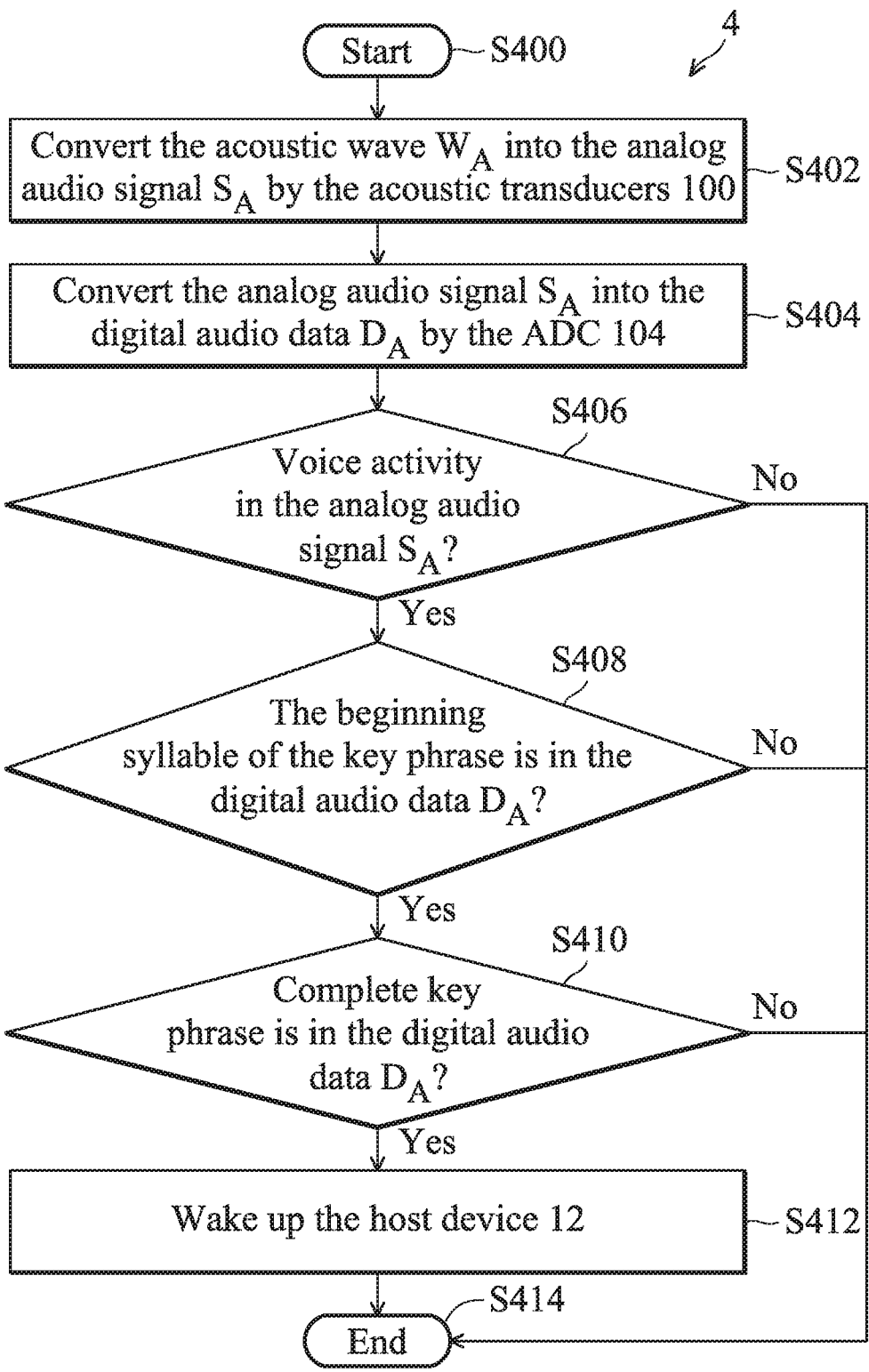
FIG. 4 is a flowchart of a voice interface method 4 according to an embodiment of the invention.

FIG. 4 is a flowchart of a voice interface method 4 according to an embodiment of the invention, incorporating the voice interface system 1, 2, or 3 in FIGS. 1 through 3. The voice interface system 1 is used to illustrate each step of the voice interface method 4. The voice interface method 4 is initiated upon power-up or when a voice interface function is activated (S400).

Upon startup, the voice interface method 4 converts the acoustic wave $W_A$ into an analog audio signal $S_A$ by acoustic transducers 100 (S402), converts the analog audio signal $S_A$ into digital audio data $D_A$ by the ADC 102 (S404), and then stores the digital audio data $D_A$ into the voice buffer 104 on a FIFO basis.

Meanwhile, the voice interface method 4 also determines whether there is voice activity in the analog audio signal $S_A$ by the VAD 106 (S406). When the voice activity is present in the analog audio signal $S_A$, the voice interface method 4 then determines whether the beginning syllable of the key phrase is in the digital audio data $D_A$ by the XSD 1080 of the controller 108 (S408). Conversely when the voice activity is absent from the analog audio signal $S_A$, the voice interface method 4 jumps to Step S414 to exit. In some embodiments, the voice interface method 4 may determine whether the group of syllables, rather than just the beginning syllable of the key phrase, is present in the digital audio data $D_A$ by the XSD 1080 of the controller 108 (S408). The key phrase may be user-configured or application-specific, and may be stored in the local memory device in the voice interface system 1.

Next, when the beginning syllable of the key phrase is present in the digital audio data $D_A$, the voice interface method 4 determines whether the complete key phrase is in the digital audio data by the KPD 1082 of the controller 108 (S410). Otherwise when the beginning syllable of the key phrase is absent from the digital audio data $D_A$, the voice interface method 4 jumps to Step S414 to exit.

When a match for the complete key phrase is found in the digital audio data $D_A$, the voice interface method 4 transmits the control signal $S_{ctrl}$ which contains the wake-up trigger to the host device 12 (S412). The host device 12 is woken up upon receiving the wake-up trigger from the voice interface device 10, and subsequently performs the speech interface service according to the voice command in the digital audio data $D_A$ or redirects the digital audio data $D_A$ to the voice service engine in the cloud server via the Internet.

The voice interface method 4 is then terminated and exited (S414).

In some embodiments, when the key phrase is detected in the digital audio data $D_A$, the voice interface method 4 further generates configuration information of the acoustic transducers 100 based on the digital audio data $D_A$ by an audio analysis circuit, and transmit the configuration information to the host device 12, wherein the configuration information of the acoustic transducers 100 includes a transducer phase, a transducer sensitivity, a transducer noise floor, a transducer placement geometry, inter-transducer distances, and a transducer frequency response of the acoustic conversion circuit.

In other embodiments, when the key phrase is detected in the digital audio data $D_A$, the voice interface method 4 further generates ambient acoustics information based on the digital audio data $D_A$ by the audio analysis circuit, and transmit the ambient acoustics information to the host device 12, wherein the ambient acoustics information includes a classification and a feature extracted from the digital audio data $D_A$.

In yet other embodiments, when the key phrase is detected in the digital audio data $D_A$, the voice interface method 4 further performs the voice signal enhancements on the digital audio data by a voice signal processing circuit, wherein the voice signal enhancements include, but are not limited to, the acoustic echo cancellation, the noise suppression, and the microphone array signal processing. In still other embodiments, when the key phrase is detected in the digital audio data $D_A$, the voice interface method 4 further compresses the digital audio data $D_A$ by the voice signal processing circuit and transmits the compressed digital audio data to the host device 12.

The voice interface method 4 allows the host device 12 to enter the sleep mode for reducing power consumption, while utilizing the voice interface device 10 to wake up the host device 12, extract the useful acoustic ambient information and configuration information, and enhance the digital audio data $D_A$ to provide seamless and enhanced voice interface services whenever required.

As used herein, the term "determining" encompasses calculating, computing, processing, deriving, investigating, looking up (e.g., looking up in a table, a database or another data structure), ascertaining and the like. Also, "determining" may include resolving, selecting, choosing, establishing and the like.

The various illustrative logical blocks, modules and circuits described in connection with the present disclosure may be implemented or performed with a general-purpose processor, a digital signal processor (DSP), an application-specific integrated circuit (ASIC), a field programmable gate array signal (FPGA) or another programmable logic device, discrete gate or transistor logic, discrete hardware components or any combination thereof designed to perform the functions described herein. A general purpose processor may be a microprocessor, but in the alternative, the processor may be any commercially available processor, controller, microcontroller or state machine.

The operations and functions of the various logical blocks, units, modules, circuits and systems described herein may be implemented by way of, but not limited to, hardware, firmware, software, software in execution, and combinations thereof.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements

What is claimed is:

1. An audio device, coupled to a host device, comprising:
an acoustic conversion circuit, configured to convert an acoustic wave into an analog audio signal;
an analog-to-digital converter (ADC), coupled to the acoustic conversion circuit, configured to convert the analog audio signal into digital audio data; and
a controller comprising:
a first-level voice detection circuit, coupled to the acoustic conversion circuit, configured to detect voice activity in the analog audio signal;
a second-level voice detection circuit, coupled to the first-level voice detection circuit, configured to detect a beginning syllable of a key phrase in the digital audio data when the voice activity is detected; and
a third-level voice detection circuit, coupled to the second-level voice detection circuit, configured to detect the key phrase from the digital audio data only when the beginning syllable of the key phrase is detected in the digital audio data.

2. The audio device of claim 1, wherein when the key phrase is detected in the digital audio data, the third-level voice detection circuit is configured to transmit a wake-up signal to the host device, to wake up the host device from a sleep mode.

3. The audio device of claim 1, wherein the controller further comprises:
an audio analysis circuit, coupled to the third-level voice detection circuit, and when the key phrase is detected in the digital audio data, configured to generate configuration information of the acoustic conversion circuit based on the digital audio data, and transmit the configuration information to the host device.

4. The audio device of claim 3, wherein the configuration information of the acoustic conversion circuit comprises a transducer phase, a transducer sensitivity, a transducer noise floor, a transducer placement geometry, inter-transducer distances, and a transducer frequency response of the acoustic conversion circuit.

5. The audio device of claim 3, wherein when the key phrase is detected in the digital audio data, the audio analysis circuit is further configured to generate ambient acoustics information based on the digital audio data and transmit the ambient acoustics information to the host device; and the ambient acoustics information comprises a classification and a feature extracted from the digital audio data.

6. The audio device of claim 5, wherein the voice signal processing circuit is configured to compress the digital audio data and transmit the compressed digital audio data to the host device.

7. The audio device of claim 1, wherein the controller further comprises:
a voice signal processing circuit, coupled to the third-level voice detection circuit, and when the key phrase is detected in the digital audio data, configured to performing voice signal enhancement on the digital audio data.

8. The audio device of claim 1, further comprises:
a voice data buffer, coupled to the ADC, configured to buffer the digital audio data from the ADC.

9. The audio device of claim 1, wherein the key phrase is user-defined.

10. A method, adopted by an audio device to detect a voice, wherein the audio device is coupled to a host device, the method comprising:
converting, by an acoustic conversion circuit, an acoustic wave into an analog audio signal;
converting, by an analog-to-digital converter (ADC), the analog audio signal into digital audio data; and
detecting, by a first-level voice detection circuit, voice activity in the analog audio signal;
detecting, by a second-level voice detection circuit, a beginning syllable of a key phrase in the digital audio data when the voice activity is detected in the digital audio data; and
detecting, by a third-level voice detection circuit, the key phrase from the digital audio data only when the beginning syllable of the key phrase is detected in the digital audio data.

11. The method of claim 10, further comprises:
when the key phrase is detected in the digital audio data, transmitting, by the third-level voice detection circuit, a wake-up signal to the host device, to wake up a host device from a sleep mode.

12. The method of claim 10, further comprising:
when the key phrase is detected in the digital audio data, generating, by an audio analysis circuit, configuration information of the acoustic conversion circuit based on the digital audio data, and transmitting the configuration information to the host device.

13. The method of claim 12, wherein the configuration information of the acoustic conversion circuit comprises a transducer phase, a transducer sensitivity, a transducer noise floor, a transducer placement geometry, inter-transducer distances, and a transducer frequency response of the acoustic conversion circuit.

14. The method of claim 12, further comprises:
when the key phrase is detected in the digital audio data, generating, by an audio analysis circuit, ambient acoustics information based on the digital audio data;
transmitting, by an audio analysis circuit, the ambient acoustics information to the host device;
wherein the ambient acoustics information comprises a classification and a feature extracted from the digital audio data.

15. The method of claim 10, further comprises:
when the key phrase is detected in the digital audio data, performing, by a voice signal processing circuit, voice signal enhancement on the digital audio data.

16. The method of claim 15, further comprises:
compressing, by the voice signal processing circuit, the digital audio data; and
transmitting, by the voice signal processing circuit, the compressed digital audio data to the host device.

17. The method of claim 10, further comprising:
buffering, by a voice data buffer, the digital audio data from the ADC.

18. The method of claim 10, wherein the key phrase is user-defined.

* * * * *